United States Patent [19]

Via

[11] 4,428,751
[45] Jan. 31, 1984

[54] WET PROCESSING OF TEXTILE MATERIALS AND FOAM CONTROL COMPOSITION

[75] Inventor: Ralph H. Via, Taylors, S.C.

[73] Assignee: Milliken Research Corporation, Spartanburg, S.C.

[21] Appl. No.: 362,700

[22] Filed: Mar. 29, 1982

[51] Int. Cl.³ .............................................. C09B 67/00
[52] U.S. Cl. ............................................ 8/477; 8/582; 8/584; 252/8.6; 252/8.9
[58] Field of Search .................... 8/582, 477, 584; 252/8.6, 8.9

[56] References Cited

U.S. PATENT DOCUMENTS 3,844,711 10/1974 Daeuble et al. ..................... 8/477
4,166,163 8/1979 DiBella ............................. 521/116
4,326,904 4/1982 Eckert et al. ..................... 8/477
4,345,909 8/1982 Guth et al. ....................... 8/477

Primary Examiner—A. Lionel Clingman
Attorney, Agent, or Firm—H. William Petry; Terry T. Moyer

[57] ABSTRACT

A process is provided for the wet processing of textile materials, which comprises applying to the textile material an aqueous textile-treating liquor containing a textile-treating component in an amount sufficient to provide a desired effect on the textile material, and further containing in an amount sufficient to provide foam control properties a foam control agent of the formula:

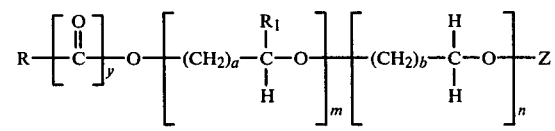

where y is O or 1; m and n are both independently selected from integers of from 0 to about 30 with the proviso that the sum of y+m+n must be at least 1; a and b are independently selected from integers of from 1 to about 7; R is an aliphatic group containing from 1 to about 40 carbon atoms; $R_1$ is an alkyl group having from 1 to about 16 carbon atoms, an alkoxy group having 1 to about 7 carbon atoms or an alkoxyalkyl group having from about 3 to about 8 carbon atoms; and Z is hydrogen, halogen, phosphate or phosphite. Also provided is a textile treating liquor which may be employed in the process.

12 Claims, No Drawings

WET PROCESSING OF TEXTILE MATERIALS AND FOAM CONTROL COMPOSITION

The present invention relates to the wet processing of textile materials and to a wet, textile processing composition containing a foam control agent.

The formation of natural and synthetic fibers into textile goods of commerce, e.g., woven, knit, tufted, and even non-woven materials, typically involves not only the mechanical treatment or arrangement of the fibers into a desired configuration, but also involves "wet" processing, that is the application of a liquid phase composition, e.g., aqueous solutions, dispersions or emulsions to the fibers at one or more stages of the processing operation to achieve a desirable result.

One very important, wet, textile processing operation is, of course, that operation whereby the textile substrate is provided with coloration, as by dyeing. Dyeing solutions for textiles may contain any of a wide variety of dyes such as acid dyes, basic dyes, disperse dyes, pigments and the like. Typical dyeing solutions may additionally contain other ingredients such as pH adjusters, surface tension modifiers, softeners, thickeners, etc., for the purpose of providing various desirable properties to the textile substrate. Other examples of wet textile processing operations, in addition to dyeing, include those relating to the finishing of the textile material, e.g., scouring to, for instance, remove size, processing oils, wax and the like. Still further examples involve the application of hand modifiers, soil- and water-repellants and even flame retardant chemicals where typically the active ingredient is applied from an aqueous solution.

A long-standing problem associated with the wet processing of textile materials is the generally undesirable formation of foam in the solution to be applied to the textile material. Typically such foam generation results from the unavoidable agitation of the liquid phase material during its handling in the textile process.

Undesired foam formation in textile processing operations may cause a wide variety of undesirable results. For instance, foaming of the liquid, dye composition applied to a particular textile material may cause streaks in the dyed textile article. In the application of flame retardants to textile materials, foaming of the liquid containing the active flame retardant material may result in uneven application and non-uniform flame retardant characteristics of the product material. In other textile processing operations such as the scouring operation foam formation in the typically large scour baths may not necessarily result in undesirable product characteristics, but it may simply be a housekeeping problem or a safety hazard.

Various chemical additives have been proposed for use as foam control agents in wet, textile processing operations. Typically such chemical additives may fall into two different functional areas, namely foam inhibitors (those additives that prevent foam formation in the first instance) and defoamers (those additives that may be added to a liquid to dissipate the foam which has already been formed). The term foam control agent as used herein is intended to cover both functional areas, namely foam inhibitors and defoamers.

Foam control agents which are known in the art include silicones, silicates, mineral oil blends containing silicates, calcium salts or fatty acids, ethylene oxide/propylene oxide copolymers and alkyl phosphates and phosphites, and aliphatic alcohols such as isooctyl alcohol. The known foam control agents are characterized by a wide variety of deficiencies, inherent to each class, which make them unattractive in textile wet processing operations. For example, silicones may cause streaking of the textile substrate material and they may also deposit on the surface of equipment used in textile processing. Ethylene oxide/propylene oxide foam control agents are rather limited in their textile, wet processing end use applications. Alkyl phosphates are similarly limited in their end use applications and even in those areas where they do have utility they frequently may lack efficient defoaming properties. In addition, the low molecular weight alkyl phosphates tend to be relatively toxic.

Yet another category of foam control agents, namely fatty acid salts may leave undesirable deposits on the textile processing equipment that may clog pipes and jets that are contained in the processing system. Aliphatic alcohols, which have found wide use in textile processing applications, unfortunately suffer from poor defoaming efficiency in many textile wet processing operations and they have an unpleasant odor that may cause nausea even at very low concentrations in the atmosphere surrounding the containment vessels to which workers may be exposed.

The present invention resides in the discovery of a whole new class of highly efficient, non-malodorous, foam control agents having utility in textile wet processing operations which overcome many if not all of the disadvantages associated with the known foam control agents. The foam control agents of the present invention function by not only inhibiting foam formation but also by dissipating foam once it has been formed.

According to the present invention a process is provided for the wet processing of textile materials, which comprises applying to the textile material an aqueous, textile-treating liquor containing a textile-treating component in an amount sufficient to provide a desired effect on the textile material, and further containing in an amount sufficient to provide foam control properties a foam control agent of the formula:

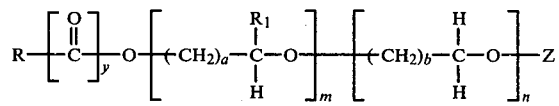

where y is 0 or 1, m and n are both independently selected from integers of from 0 to about 30, with the proviso that the sum of m+n+y must equal at least 1; a and b are independently selected from integers of from 1 to about 7; R is an aliphatic group containing from 1 to about 40 carbon atoms, R₁ is an alkyl group having from 1 to about 16 carbon atoms, an alkoxy group having 1 to about 7 carbon atoms, or an alkoxyalkyl group having from about 3 to about 8 carbon atoms; and Z is hydrogen, halogen, phosphate, or phosphite.

Also provided according to the present invention is an aqueous, textile treating liquor which comprises a textile treating component and a foam control agent as described above with regard to the textile treating composition.

The foam control agents employed in the wet processing of textile materials according to the present invention may be most generally described by reference to the structural formula set forth above.

In the above structural formula the R moiety may be selected from virtually any of a wide variety of aliphatic groups containing from 1 to about 40, preferably from about 6 to about 16, e.g., about 8 to about 12 carbon atoms. Such aliphatic groups may include linear, branched, or even cyclic groups, although branched, aliphatic groups are preferred. The aliphatic groups may include saturated groups as well as unsaturated groups, e.g., those containing from about 1 to about 3 double bonds.

Where y in the above structural formula is 0 the compounds of the present invention may be broadly referred to as ethers. Where y is 1, a preferred embodiment, the compounds may be referred to as carboxylic acid esters. In an even more preferred embodiment y is 1 and R is a branched aliphatic group.

According to the most preferred embodiment of the present invention the foam control agent may be represented by the following structural formula:

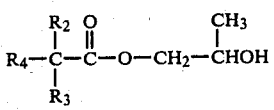

wherein $R_2$ and $R_3$ are lower alkyl groups containing from 1 to about 5 carbon atoms; and $R_4$ is a lower alkyl group containing from 2 to about 6 carbon atoms; and wherein even more preferably the sum of the carbon atoms contained in $R_2$, $R_3$ and $R_4$ is at least about 8.

Examples of compounds that may be employed according to the process of the present invention include: 1,2 propylene glycol mononeodecanoate, 1,2 propylene glycol monolaurate, 1,2 propylene glycol monooleate, 1,2 propylene glycol monocaproate, dipropylene glycol dineodecanoate, isooctanoic acid, tripropylene glycol isooctanoate, 1,4 octadecyl glycol monocaproate, tetrapropylene glycol dioleate, hexapropyleneglycol ethylene glycol distearate, and poly(propylene glycol azelate).

The foam control agent may be employed in the process of the present invention by simply mixing it into the aqueous textile-treating liquor. In general, the amount of foam control agent employed will be an amount sufficient to control foaming, e.g., either foam formation or defoaming of the aqueous liquor. Typically from about 0.05 to about 1.0 percent by weight based upon the weight of the textile-treating liquor may be employed. Preferably from about 0.2 to about 0.5 percent may be employed.

As mentioned above, the process of the present invention is a wet process wherein an aqueous liquor is applied to a textile material in order to achieve a desired effect under conditions where foaming of the liquor may undesirably occur. The aqueous liquor may be applied at virtually any stage in the process of transforming natural or synthetic fibers or blends of natural and synthetic fibers into a textile material product. Typically, however, the aqueous liquid will be subjected to at least a minor amount of agitation, perhaps just prior to or simultaneous with its application to the textile material. Such agitation of the aqueous liquor may occur in a variety of ways. For instance, it may occur in a continuous process, simply by passing a continuous length of textile sheet material, e.g., fabric, through a bath of the aqueous liquor. Agitation may occur in a batch-type process where textile material is placed in a bath of the liquor and is agitated to, for instance, achieve uniformity of a desired effect. Application of the aqueous liquor may be most frequently accomplished at atmospheric pressure although higher or lower pressures may also be applied.

Examples of wet textile processes within the scope of the present invention include a wide variety of washing operations that may be performed on the fibers or yarns prior to or during mechanical processing into a greige fabric; washing of the greige fabric prior to or during the finishing operation to, for example, remove size, processing oils, wax, and washing of the textile material after the so-called finishing operation. In such washing operations the only active textile treating component in the aqueous liquor may be water since even then foaming may become a problem especially after the wash liquor becomes contaminated with size and other contaminants present on the textile material. Alternatively, however, the wash liquor may contain various detergents that may contribute to the foaming problem.

Yet another wet textile process within the scope of the present invention involves the application of a dye solution as the aqueous liquor applied to the textile material. Where the aqueous liquor is a dye solution the term "solution" is employed herein to include not only solutions per se, e.g., where the dye is completely dissolved in the liquor but it is intended also to include dye liquors where the dye is merely suspended in the liquor. The dye may be present in an amount sufficient to provide coloration to the textile material. Typically the dye will be present in an amount of from about 0.005 percent to 1.0 percent by weight, preferably about 0.01 to 0.6 percent by weight based upon the weight of the aqueous liquor. Dyes that may be employed in the dye solution include virtually any dyes that may be applied from an aqueous liquor, e.g., acid dyes, basic dyes, reactive dyes, and so forth, although the process of the present invention may be especially suitable for use where acid dyes are to be applied to the textile material.

Where the textile-treating liquor is a dye solution any of a wide variety of well-known application techniques may be employed where undesired foaming of the dye solution may be encountered. Such techniques may involve continuous dyeing or batch-type dyeing. Examples of batch-type dyeing include beck dyeing, jet dyeing, package dyeing, etc. Examples of continuous dyeing operations where undesired foaming may be encountered include Kuster dyeing operations.

Additional dyeing operations where a dye solution may be applied to a textile material under conditions where undesired foaming may be encountered include those operations where the dye is applied to the textile material in the form of a pattern, e.g., screen printing operations and in particular jet dye injection printing operations where the dye solution is continuously being recirculated through narrow orifices or "dye jets" under conditions of very high shear, e.g., high agitation conditions. In jet dye injection printing operations foaming of the dye solution may actually be a very significant problem. Typical jet dye injection machines that may be employed in the process include those disclosed in U.S. Pat. No. 4,084,615 to Norman E. Klein and William H. Stewart, assigned to Milliken Research Corporation, the disclosure of which is hereby incorporated herein by reference.

Other aqueous, textile treating liquors that may be employed according to the process of the present invention include various finishing liquors, e.g., hand modifiers, soil release compositions, water proofing compositions and the like.

In addition to the active, textile treating component and the foam control agent, both of which are described above, the aqueous, textile treating liquor may contain additional ingredients such as surfactants, viscosity modifiers, pigments, whitening agents as well as additional foam control agents and the like which may either assist in ease of processing or in improving the properties of the textile material product. The use of such additional ingredients will be readily apparent to those skilled in this particular art.

The present invention may be further understood by reference to the following examples which are not to be construed as unduly limiting the subject matter of the invention which is defined in the appended claims. Unless otherwise indicated all parts and percentages are by weight.

The Waring Blender Test

A convenient method for evaluating foam control agents on a laboratory scale may be accomplished using a standard Waring blender having a rated, one liter barrel liquid capacity, a six inch effective length and a scalloped cross section. According to the standard test procedure a five hundred gram, aqueous mass of the liquid to be foamed was charged to the blender barrel. The original liquid level was then marked on the barrel exterior by means of a strip of tape. The liquid was then blended for one minute at maximum shear rate. The instant the blending motor is turned off the foam height was measured as the distance in inches from the original liquid level to the foamed liquid-air interface. This measurement is referred to herein as the original foam height. This same measurement was repeated at subsequent two, one minute intervals to establish a foam dissipating rate.

EXAMPLE 1

To a two liter stainless steel reactor equipped with stirrer, temperature and pressure controls, and gas inlets was charged 920 grams of neodecanoic acid (5 moles) and two grams of fine, crushed potassium hydroxide. The reactor was then sealed and placed internally in an inert atmosphere by a three cycle pressure/vacuum procedure using nitrogen in each cycle to increase pressure. Any excess water was recovered from the neodecanoic acid by heating to 110° C. at a pressure of 20 mm for 30 minutes, and finally placed at positive nitrogen pressure. In a separate stainless steel, high pressure weight cylinder was placed, by differential weighing, 290 grams (5 moles) of propylene oxide. The weigh cylinder was next attached to one of the reactor's gas inlet lines. The prepared reactor containing neodecanoic acid and catalyst was next heated to 125° C., at which time propylene oxide from the weigh cylinder was forced into the reactor by nitrogen pressure. At the end of 45 minutes, the reactor was cooled to 120° C. and vacuum stripped for 30 minutes. Analysis of the reactor mass, a clear, light, amber-colored oil, indicated a 0.69 mole propylene oxide adduct of neodecanoic acid with an acid number of 77.3 and a hydroxyl number of 188.1.

EXAMPLE 2

The antifoaming properties of the compound prepared according to Example 1 were determined by comparison to a control sample and a comparative sample containing isooctanol. Three identical 500 gram solutions were made up, each containing 2 grams per liter of an eight (8) mole ethylene oxide adduct of tridecyl alcohol, a high foaming surfactant. Solution A, the control sample contained no additional ingredients. Solution B contained 2.5 grams of isooctyl alcohol. Solution C contained 2.5 grams of the product prepared according to Example 1. Each sample was foamed by the Waring Blender test described above. The results are summarized below in Table I.

TABLE I

| Mix | Antifoam | Foam Height Inches | | |
|---|---|---|---|---|
| | | Initial | After 1 minute | After 2 minutes |
| A | None | Generated 2 liters of foam | | |
| B | Isooctanol | 2" | ¾" | ½" |
| C | Example 1 | 2" | 1" | ⅝" |

Example 2 and Table I demonstrate the positive foam control characteristics of the product made according to Example 1. In addition it was observed that bath C containing the product of Example 1 had an extremely low odor factor as compared to bath B containing isooctanol.

EXAMPLE 3

Using the preparation procedure outlined above in Example 1 a variety of propylene oxide adducts of organic acids were prepared and were evaluated as foam control agents in an acid dye bath. The results of the evaluation are summarized in Table II below. In each instance the acid dye bath contained the following ingredients in parts by weight:

| ACID DYE BATH I | |
|---|---|
| Parts | Component |
| 0.5 | Foam control agent |
| 10 | Dye stock solution of Erionyl Red BW 100% 54.8 g/l |
| 50 | Guar gum (1% by weight in water) |
| .2 | Print Penetrant* |
| 39 | Water |

*A 50 percent aqueous solution of an active ingredient compound of approximately 19 moles of ethylene oxide polymerized on a hydrogen active hydrophobe composed of about 50 parts of dodecyl alcohol and 50 parts of tridecyl alcohol.

The Dye Bath I had an LV Brookfield viscosity (number 3, spindle at 30 rpms) of from about 280 to 350 centipoises and the pH was adjusted to 3.0 with 90 percent formic acid. The foam controlling properties of a wide range of compounds within the scope of the present invention were evaluated and may be compared to a control test where no foam control agent was provided and a comparative test where the foam control agent employed was the known material, isooctyl alcohol. Foam control characteristics were evaluated by the Waring Blender Test Method.

TABLE II

| Mix | Foam Control Agent | Foam Height Inches | | |
|---|---|---|---|---|
| | | Initial | After 1 Minute | After 2 Minutes |
| A | None | 3⅛ | 3⅛ | 3⅛ |
| B | Isooctyl alcohol | 2⅜ | 2 | 1⅛ |

TABLE II-continued

| Mix | Foam Control Agent | Foam Height Inches | | |
|---|---|---|---|---|
| | | Initial | After 1 Minute | After 2 Minutes |
| C | Neodecanoic acid | 2⅞ | 2¾ | 2¾ |
| D | Neodecanoic acid plus 0.54 moles of propylene oxide | 2⅝ | 2 | 1⅝ |
| E | Neodecanoic acid plus 0.82 moles of propylene oxide | 2¼ | 1⅞ | 1½ |
| F | Neodecanoic acid plus 1 mole of propylene oxide | 2¼ | 1⅞ | 1¾ |
| G | Neodecanoic acid plus 1.25 moles of propylene oxide | 2⅝ | 2¼ | 2 |
| H | Neodecanoic acid plus 1.5 moles of propylene oxide | 2⅝ | 2¼ | 2⅛ |
| I | Neodecanoic acid plus 1.75 moles of propylene oxide | 2⅝ | 2¼ | 2⅛ |
| J | Neodecanoic acid plus 4 moles of propylene oxide | 2⅝ | 2¼ | 2¼ |
| K | Neodecanoic acid plus 7 moles of propylene oxide | 2⅛ | 2¼ | 2⅛ |
| L | Nonyl alcohol | 2⅞ | 2⅞ | 2⅞ |
| M | Nonyl alcohol plus 1 mole of propylene oxide | 2⅞ | 2¾ | 2¾ |
| N | Lauryl alcohol | 3⅛ | 2¼ | 2⅛ |
| O | Lauryl alcohol plus 1 mole of propylene oxide | 2¾ | 2⅞ | 2⅞ |
| P | Lauric acid | 2⅞ | 2⅞ | 2⅞ |
| Q | Lauric acid plus 1 mole of propylene oxide | 2½ | 2⅜ | 2⅛ |
| R | Lauric acid plus 2 moles of propylene oxide | 3 | 3 | 3 |
| S | Capric/caprylic acid | 2¾ | 2⅞ | 2⅞ |
| T | Capric/caprylic acid plus 1 mole of propylene oxide | 2¼ | 2⅛ | 2⅛ |
| U | Capric/caprylic acid plus 2 moles of propylene oxide | 2⅝ | 2¼ | 2¼ |

EXAMPLE 4

Additional foam control agents were prepared according to the procedure of Example 1 and were compared to isooctyl alcohol and a control composition for their foam control properties by means of the Waring blender test method in ACID DYE BATH II which differed from ACID DYE BATH I of Example 3 only in that the viscosity was adjusted to 400 centipoises and the dye stock solution was as follows:

| Telon Blue BRL 200% | 17.148 g/l (Mobay) |
|---|---|
| Erionyl Red BW 100% | 0.552 g/l (Red 151) |
| Acidol Black MSRL | 72.78 g/l (Black 194) |

The results are summarized in TABLE III below.

TABLE III

| Mix | Foam Control Agent | Concentration, Grams/Liter | Foam Height | | |
|---|---|---|---|---|---|
| | | | Initial | After 1 Minute | 2 Minutes |
| A | None | 0 | 2⅞ | 2⅞ | 2⅞ |
| B | Isooctyl Alcohol | 2 | 2½ | 2½ | 2⅞ |
| C | NDA* - 0.75 P.O. | 2 | 2¼ | 1⅝ | 1⅝ |
| D | Isooctyl Alcohol | 3 | 2½ | 1⅞ | 1⅞ |
| E | NDA - 0.75 P.O. | 3 | 2¼ | 1¾ | 1¼ |
| F | Isooctyl Alcohol | 4 | 2½ | 1¾ | 1⅞ |
| G | NDA - 0.75 P.O. | 4 | 2¼ | 1¾ | 1⅝ |
| H | Isooctyl Alcohol | 5 | 2¼ | 1⅞ | 1⅞ |
| I | NDA - 0.75 P.O. | 5 | 2 | 1¼ | 1¼ |

*NDA is a shorthand designation for neodecanoic acid.

EXAMPLE 5

Four separate batches of Acid Dye Bath I (see Example 3) were prepared each containing thirty liters. A different foam control agent identified below in Table IV was added to each bath to the identical concentration of five grams per liter. Each bath was placed in a separate circulation system of a jet dye injection machine of the type disclosed in U.S. Pat. No. 4,084,615 thereby feeding a separate gun bar. The four systems were circulated for two hours to reach a normal potential foam build-up at which time a commonbase, nylon carpet was dyed from each gun bar representing each of the four acid dye formulations. The dyed carpet was steamed, washed and oven-dried. All four carpets were determined to be equivalent in uniformity with the carpets dyed by means of the compositions of the present invention showing an observable improvement in brightness. The four carpets dyed by means of the compositions of the invention had no alcohol or other odors. To further assess foam build-up, the dye level in each of the circulation tanks was lowered to a level where the exit of the return line into hold tank cut the plane of the dye bath surface. The increase in foam throughout the trial and after the liquid level adjustment was assessed visually and by density measurement as outlined in Table IV below. Density measurements were made in a 500 ml. cylinder and recorded as grams/ml. Experience has shown that in general a foam density greater than 0.94 is satisfactory for manufacturing textile goods on a jet dye injection machine.

TABLE IV

| Foam Control Agent | Densities, gms/ml | | | |
|---|---|---|---|---|
| | Initial | 1:35 p.m. | *2:30 p.m. | 4:15 p.m. |
| Isooctyl Alcohol | 0.9793 | 0.9814 | 0.9726 | 0.9188 |
| NDA 0.5 P.O. | 0.9827 | 0.9814 | 0.9358 | 0.8804 |
| NDA 0.75 P.O. | 0.9984 | 0.9954 | 0.9442 | 0.9426 |
| NDA 1.5 P.O. | 0.9939 | 0.9674 | 0.9214 | 0.9234 |

*Dropped level of Bath to generate foam at 2:15 p.m.

All gun bars remained clean through the run.

What is claimed is:

1. A process for the wet processing of textile materials, which comprises applying to the textile material an aqueous, textile-treating liquor containing a textile-treating component in an amount sufficient to provide a desired effect on the textile material, and further containing in an amount sufficient to provide foam control properties a foam control agent of the formula:

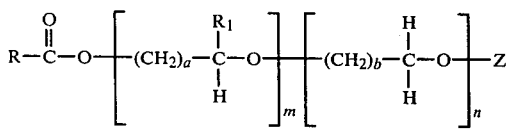

where m and n are both independently selected from integers of from 0 to about 30 with the proviso that the sum of m+n must equal at least 1; a and b are independently selected from integers of from 1 to about 7; R is an aliphatic group containing from 1 to about 40 carbon atoms; $R_1$ is an alkyl group having from 1 to about 16 carbon atoms, an alkoxy group having 1 to about 7 carbon atoms or an alkoxyalkyl group having from about 3 to about 8 carbon atoms; and Z is hydrogen, halogen, phosphate, or phosphite.

2. The process of claim 1 wherein said textile-treating component of said textile-treating liquor is a dye.

3. The process of claim 2 wherein said dye is an acid dye.

4. The process of claim 1 wherein R is a branched aliphatic group.

5. The process of claim 4 wherein said branched group is of the structure:

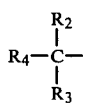

wherein $R_2$ and $R_3$ are lower alkyl groups containing from 1 to about 5 carbon atoms; and $R_4$ is a lower alkyl group containing from 2 to about 6 carbon atoms.

6. The process of claim 1 wherein said foam control agent has the formula

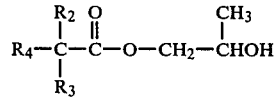

wherein $R_2$ and $R_3$ are lower alkyl groups containing from 1 to about 5 carbon atoms; and $R_4$ is a lower alkyl group containing from 2 to about 6 carbon atoms.

7. An aqueous, textile-treating composition, which comprises a textile treating component in an amount sufficient to provide a desired effect on a textile material, and further in amount sufficient to provide a desired effect on the textile material, and further containing in an amount sufficient to provide foam control properties a foam control agent of the formula:

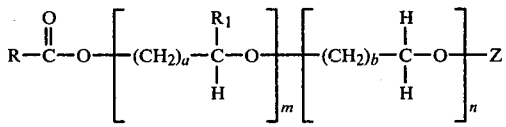

where m and n are both independently selected from integers of from 0 to about 30 with the proviso that the sum of m+n must equal at least 1; a and b are independently selected from integers of from 1 to about 7; R is an aliphatic group containing from 1 to about 40 carbon atoms; $R_1$ is an alkyl group having from 1 to about 16 carbon atoms, an alkoxy group having 1 to about 7 carbon atoms or an alkoxyalkyl group having from about 3 to about 8 carbon atoms; and Z is hydrogen, halogen, phosphate or phosphite.

8. The composition of claim 7 wherein said textile treating component is a dye.

9. The composition of claim 8 wherein said dye is an acid dye.

10. The composition of claim 7 wherein R is a branched aliphatic group.

11. The composition of claim 10 wherein said branched aliphatic group is of the structure

wherein $R_2$ and $R_3$ are lower alkyl groups containing from 1 to about 5 carbon atoms; and $R_4$ is a lower alkyl group containing from 2 to about 6 carbon atoms.

12. The composition of claim 7 wherein said foam control agent has the formula

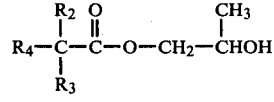

wherein $R_2$ and $R_3$ are lower alkyl groups containing from 1 to about 5 carbon atoms; and $R_4$ is a lower alkyl group containing from 2 to about 6 carbon atoms.

* * * * *